United States Patent
Gomes et al.

(10) Patent No.: US 10,145,589 B2
(45) Date of Patent: Dec. 4, 2018

(54) NET HEAT LOAD COMPENSATION CONTROL METHOD AND APPLIANCE FOR TEMPERATURE STABILITY

(71) Applicant: Whirlpool Corporation, Benton Harbor, MI (US)

(72) Inventors: Alberto R. Gomes, Saint Joseph, MI (US); Stephen L. Keres, Watervliet, MI (US); Andrew D. Litch, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 1386 days.

(21) Appl. No.: 13/833,577

(22) Filed: Mar. 15, 2013

(65) Prior Publication Data

US 2014/0260377 A1    Sep. 18, 2014

(51) Int. Cl.
  *F25B 5/02*   (2006.01)
  *F25B 49/02*   (2006.01)

(52) U.S. Cl.
  CPC .............. *F25B 5/02* (2013.01); *F25B 49/022* (2013.01); *F25B 49/027* (2013.01); *F25B 2500/19* (2013.01); *F25B 2600/01* (2013.01); *F25B 2600/0251* (2013.01); *F25B 2600/111* (2013.01); *F25B 2600/112* (2013.01); *F25B 2700/151* (2013.01); *F25B 2700/2104* (2013.01); *Y02B 30/743* (2013.01); *Y02B 40/32* (2013.01)

(58) Field of Classification Search
  CPC .............. F25B 2600/01; F25B 2600/02; F25B 2600/023; F25B 2600/024; F25B 5/02; F25B 49/022; F25B 2700/151; F25D 2700/12
  See application file for complete search history.

(56) References Cited

U.S. PATENT DOCUMENTS

| | | | |
|---|---|---|---|
| 2,637,175 A * | 5/1953 | Alexander ............. | B60H 1/323 318/1 |
| 4,151,725 A * | 5/1979 | Kountz ............... | F04D 27/0246 417/19 |
| 4,938,027 A | 7/1990 | Midlang | |

(Continued)

FOREIGN PATENT DOCUMENTS

WO     WO 2006129255 A1 * 12/2006    ............ F25B 49/025

*Primary Examiner* — Frantz Jules
*Assistant Examiner* — Nelson Nieves
(74) *Attorney, Agent, or Firm* — Price Heneveld LLP (57) ABSTRACT

A refrigerator and method are provided where the refrigerator includes two or more cooling compartments monitored by temperature sensors and cooled by a plurality of evaporators. The cooling for the evaporators is provided by a compressor operating on a recurring cooling cycle. A processor provides varying levels of voltages to the compressor and sets the recurring cooling cycle. The recurring cooling cycle comprises at least two cooling periods and a rest period. The method includes determines the length of the rest period as compared a predetermined rest period range. When the rest period falls outside the predetermined range, the processor selects the voltage to send to the compressor during a subsequent cooling cycle. The processor selects the voltage based on at least one of the temperature of the first and second compartments and the voltage to the compressor during the cooling cycle.

6 Claims, 5 Drawing Sheets

(56) References Cited

U.S. PATENT DOCUMENTS

| | | | | |
|---|---|---|---|---|
| 5,168,713 | A * | 12/1992 | Howland | B60H 1/00007<br>62/117 |
| 6,053,002 | A * | 4/2000 | Matsumoto | F24F 11/008<br>318/803 |
| 6,342,840 | B1 | 1/2002 | Dunn | |
| 6,370,895 | B1 * | 4/2002 | Sakuma | F25B 5/02<br>62/152 |
| 6,463,747 | B1 * | 10/2002 | Temple | F24F 11/008<br>62/126 |
| 7,100,387 | B2 | 9/2006 | Boer et al. | |
| 7,757,501 | B2 * | 7/2010 | Boer | F25D 17/065<br>62/157 |
| 8,152,475 | B2 | 4/2012 | Sorge | |
| 8,528,353 | B2 * | 9/2013 | Sung | F25B 49/025<br>62/228.1 |
| 8,596,082 | B2 * | 12/2013 | Sung | F25B 49/025<br>62/228.1 |
| 9,140,478 | B2 * | 9/2015 | Gomes | F25D 11/02 |
| 2002/0026801 | A1 * | 3/2002 | Yamashita | F04B 35/04<br>62/181 |
| 2002/0157408 | A1 * | 10/2002 | Egawa | F25B 49/025<br>62/228.1 |
| 2003/0131618 | A1 * | 7/2003 | Doi | F25B 1/10<br>62/180 |
| 2003/0177773 | A1 * | 9/2003 | Kim | F04B 35/045<br>62/156 |
| 2003/0209019 | A1 * | 11/2003 | Lee | F25D 29/00<br>62/131 |
| 2003/0233837 | A1 * | 12/2003 | Lee | F25B 13/00<br>62/175 |
| 2003/0233838 | A1 * | 12/2003 | Lee | F25B 13/00<br>62/175 |
| 2004/0003606 | A1 * | 1/2004 | So | F25B 49/022<br>62/158 |
| 2004/0103674 | A1 * | 6/2004 | Boer | F25D 11/022<br>62/157 |
| 2004/0112070 | A1 * | 6/2004 | Schanin | F25D 29/00<br>62/132 |
| 2004/0177633 | A1 * | 9/2004 | Moon | F24F 11/008<br>62/228.1 |
| 2005/0204773 | A1 * | 9/2005 | Imai | F25B 1/10<br>62/512 |
| 2007/0044493 | A1 * | 3/2007 | Kearney | F25B 5/02<br>62/259.2 |
| 2007/0144190 | A1 * | 6/2007 | Temmyo | F25D 29/00<br>62/180 |
| 2008/0066478 | A1 * | 3/2008 | Okamoto | F04C 18/322<br>62/151 |
| 2008/0223058 | A1 * | 9/2008 | Suzuki | B60H 1/3208<br>62/228.5 |
| 2009/0049849 | A1 * | 2/2009 | Kim | F25B 49/022<br>62/156 |
| 2009/0093911 | A1 * | 4/2009 | Caillat | F04B 39/0027<br>700/280 |
| 2009/0105884 | A1 * | 4/2009 | Kaga | F25B 49/025<br>700/275 |
| 2009/0225479 | A1 * | 9/2009 | Jayanth | G01R 19/10<br>361/30 |
| 2009/0235677 | A1 * | 9/2009 | Yanagida | F25B 49/025<br>62/115 |
| 2010/0063634 | A1 * | 3/2010 | Sung | F25B 49/025<br>700/275 |
| 2010/0082160 | A1 * | 4/2010 | Kondou | F25B 49/025<br>700/275 |
| 2010/0125368 | A1 * | 5/2010 | Bailey | F24F 11/0012<br>700/276 |
| 2010/0132385 | A1 * | 6/2010 | Yoo | F25D 29/006<br>62/115 |
| 2010/0218519 | A1 * | 9/2010 | Hall | F25B 41/062<br>62/73 |
| 2010/0235013 | A1 * | 9/2010 | Suzuki | F25B 49/022<br>700/300 |
| 2010/0293397 | A1 * | 11/2010 | Pham | F04B 49/065<br>713/300 |
| 2011/0030402 | A1 * | 2/2011 | Shinya | F25B 49/027<br>62/186 |
| 2011/0041525 | A1 * | 2/2011 | Kim | F25D 11/022<br>62/89 |
| 2011/0129361 | A1 * | 6/2011 | Sato | F04B 49/065<br>417/53 |
| 2011/0302938 | A1 * | 12/2011 | Lee | F25D 17/065<br>62/89 |
| 2012/0117995 | A1 * | 5/2012 | Moore | F25B 49/022<br>62/157 |
| 2012/0137713 | A1 * | 6/2012 | Duraisamy | B60P 3/20<br>62/228.1 |
| 2012/0226388 | A1 * | 9/2012 | Evans | F24F 11/0012<br>700/299 |
| 2013/0000330 | A1 * | 1/2013 | Tsuruma | F25B 49/025<br>62/126 |
| 2013/0037253 | A1 * | 2/2013 | Schneider | H05K 7/207<br>165/267 |
| 2013/0061618 | A1 * | 3/2013 | Wait | F25D 29/00<br>62/89 |
| 2013/0305751 | A1 * | 11/2013 | Gomes | F25D 11/02<br>62/89 |

* cited by examiner

NET HEAT LOAD COMPENSATION CONTROL METHOD AND APPLIANCE FOR TEMPERATURE STABILITY

CROSS-REFERENCE TO RELATED APPLICATIONS

The present application is related to U.S. patent application Ser. No. 13/836,130, filed Mar. 15, 2013, entitled ROBUST FIXED-SEQUENCE CONTROL METHOD AND APPLIANCE FOR EXCEPTIONAL TEMPERATURE STABILITY which is incorporated herein by reference in its entirety.

FIELD OF THE INVENTION

The present invention generally relates to a sequential dual evaporator refrigerator, and more particularly relates to a particular method of controlling the same.

SUMMARY OF THE INVENTION

A net heat load compensation control provides a method for controlling temperature in an appliance cooling system. The method includes the step of providing an electric compressor operating in a recurring cooling cycle. The recurring cooling cycle comprises a first cooling period for cooling a first interior, a second cooling period for cooling a second interior, and a rest period. The method also includes the step of providing a processor for selecting a command input signal to be supplied to the electric compressor to establish the recurring cooling cycle. The processor accomplishes various steps of the method by: monitoring voltage to the compressor during the recurring cooling cycle, monitoring the length of the rest period, monitoring the temperature of the first interior, monitoring the temperature of the second interior, and selecting the command input signal to supply to the compressor during the subsequent first or second cooling period. The command input signal selection step occurs when the length of the rest period falls outside the predetermined range. At this point, the command input signal is selected based on at least one of the first and second temperatures and the voltage to the compressor during the cooling cycle.

A second method for controlling the temperature in an appliance includes providing an electric compressor operating a in a recurring cooling cycle wherein each recurring cooling cycle comprises a first cooling period for cooling a first interior, a second cooling period for cooling a second interior, and a rest period. This method also includes providing a processor for supplying a command input signal to the electric compressor to establish the recurring cooling cycle. During the first cooling period, the processor supplies a first cooling period voltage to the compressor that falls between a first baseline voltage and a first maximum voltage. During the second cooling period, the processor supplies a second cooling period voltage to the compressor that falls between a second baseline voltage and a second maximum voltage. The processor also accomplishes the step of monitoring a first voltage difference between the first cooling period voltage and the first baseline voltage, and a second voltage difference between the second cooling period voltage and the second baseline voltage. The processor accomplishes various steps of the method by: monitoring voltage to the compressor during the recurring cooling cycle, monitoring the length of the rest period, monitoring the temperature of the first interior, monitoring the temperature of the second interior, and selecting the command input signal to supply to the compressor during the subsequent first or second cooling period. The command input signal selection step occurs when the length of the rest period falls outside the predetermined range. At this point the command input signal is supplied based on at least one of the first and second temperatures and the voltage to the compressor during the cooling cycle.

The present invention also provides a refrigerator having an electrical cooling system. The refrigerator includes a first interior, a second interior, and an electric compressor that operates in a recurring cooling cycle. The recurring cooling cycle includes a first cooling period for cooling the first interior, and a second cooling period for cooling the second interior, and a rest period. The refrigerator includes a processor for selecting the command input signal to be supplied to the electric compressor to establish the recurring cooling cycle. The processor is configured for: monitoring the voltage to the compressor during each recurring cooling cycle, monitoring the length of the rest period during each recurring cooling cycle, monitoring the first temperature of the first interior, and monitoring a second temperature of the second interior. The processor also selects the command input signal to supply to the compressor during a subsequent first or second cooling period. The processor supplies the command input signal when the rest period is outside of the predetermined range. The command input signal is selected and supplied based upon at least one of the first and second temperatures and the voltage to the compressor during the cooling cycle.

These and other features, advantages, and objects of the present invention will be further understood and appreciated by those skilled in the art by reference to the following specification, claims, and appended drawings.

DETAILED DESCRIPTION

Figure 1:
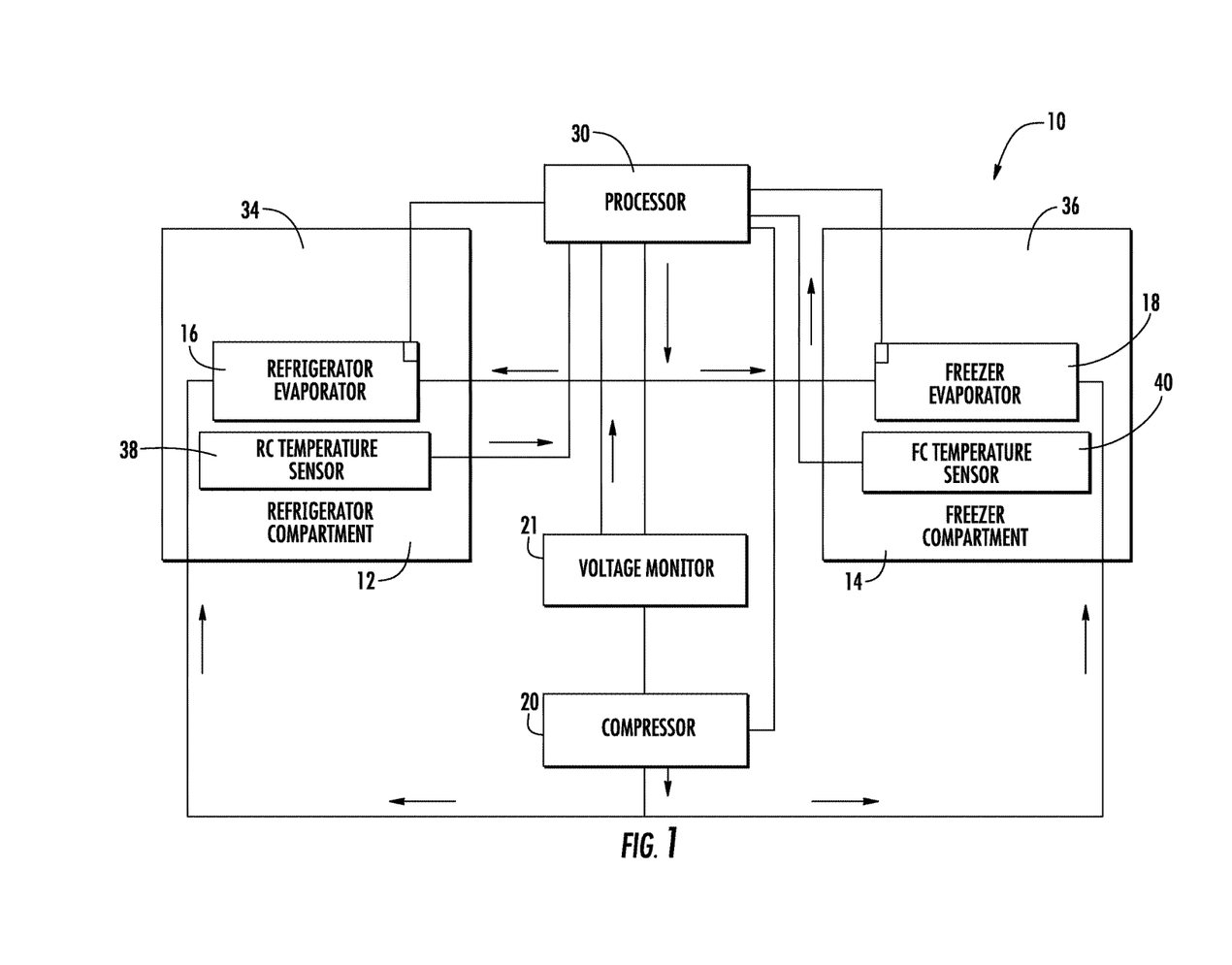
FIG. 1 is schematic view of a refrigerator that implements one embodiment of the method.
Figure 2:
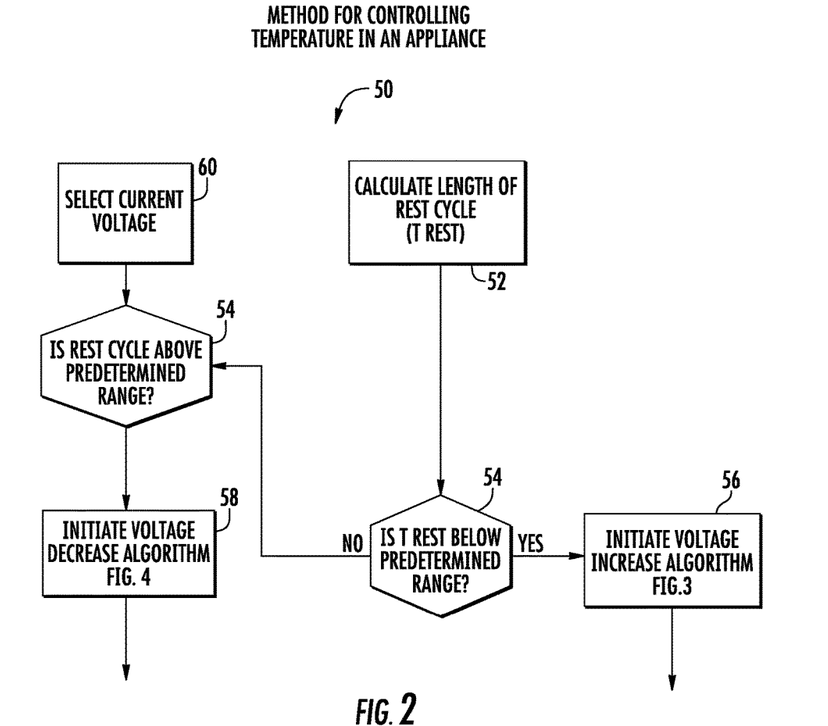
FIG. 2 is a flowchart of one embodiment of the method.

For purposes of description herein, the terms "upper," "lower," "right," "left," "rear," "front," "vertical," "horizontal," and derivatives thereof shall relate to the invention as oriented in FIG. 1, and derivatives thereof shall relate to a method for controlling temperature in an appliance cooling system, and an apparatus for performing this method. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

A net heat load compensation control provides a method for controlling temperature in an appliance cooling system.

The method includes the step of providing an electric compressor operating in a recurring cooling cycle. The recurring cooling cycle comprises a first cooling period for cooling a first interior, a second cooling period for cooling a second interior, and a rest period. The method also includes the step of providing a processor for selecting a command input signal to be supplied to the electric compressor to establish the recurring cooling cycle. The processor accomplishes various steps of the method by: monitoring voltage to the compressor during the recurring cooling cycle, monitoring the length of the rest period, monitoring the temperature of the first interior, monitoring the temperature of the second interior, and selecting the command input signal to supply to the compressor during the subsequent first or second cooling period. The command input signal selection step occurs when the length of the rest period falls outside the predetermined range. At this point, the command input signal is selected and supplied based on at least one of the first and second temperatures and the voltage to the compressor during the cooling cycle.

FIG. 1 shows a schematic representation of a refrigerator 10 according to a first embodiment. The refrigerator shown is a sequential dual evaporator refrigerator in that it includes a first interior 12 and a second interior 14 as well as first and second evaporators 16, 18 for each corresponding interior 12, 14. The refrigerator also includes an electric compressor 20 that provides cooling to the first interior 12 and the second interior 14 by providing varying degrees of cooling to the first evaporator 16 and the second evaporator 18. The amount of cooling supplied by the evaporators 16, 18 is determined by a command input signal supplied to the compressor 20. The compressor 20 operates under a recurring cooling cycle 22 that includes a first cooling period 24 where the compressor 20 provides cooling to the first evaporator 16, and a second cooling period 26 where the compressor 20 provides cooling to the second evaporator 18.

In alternative embodiments, additional cooling cycles can be provided where there are more than two evaporators in a refrigerator 10. After the completion of all the cooling periods 24, 26, the compressor initiates a rest period 28 where no command input signal is supplied to the compressor 20.

Figure 5:
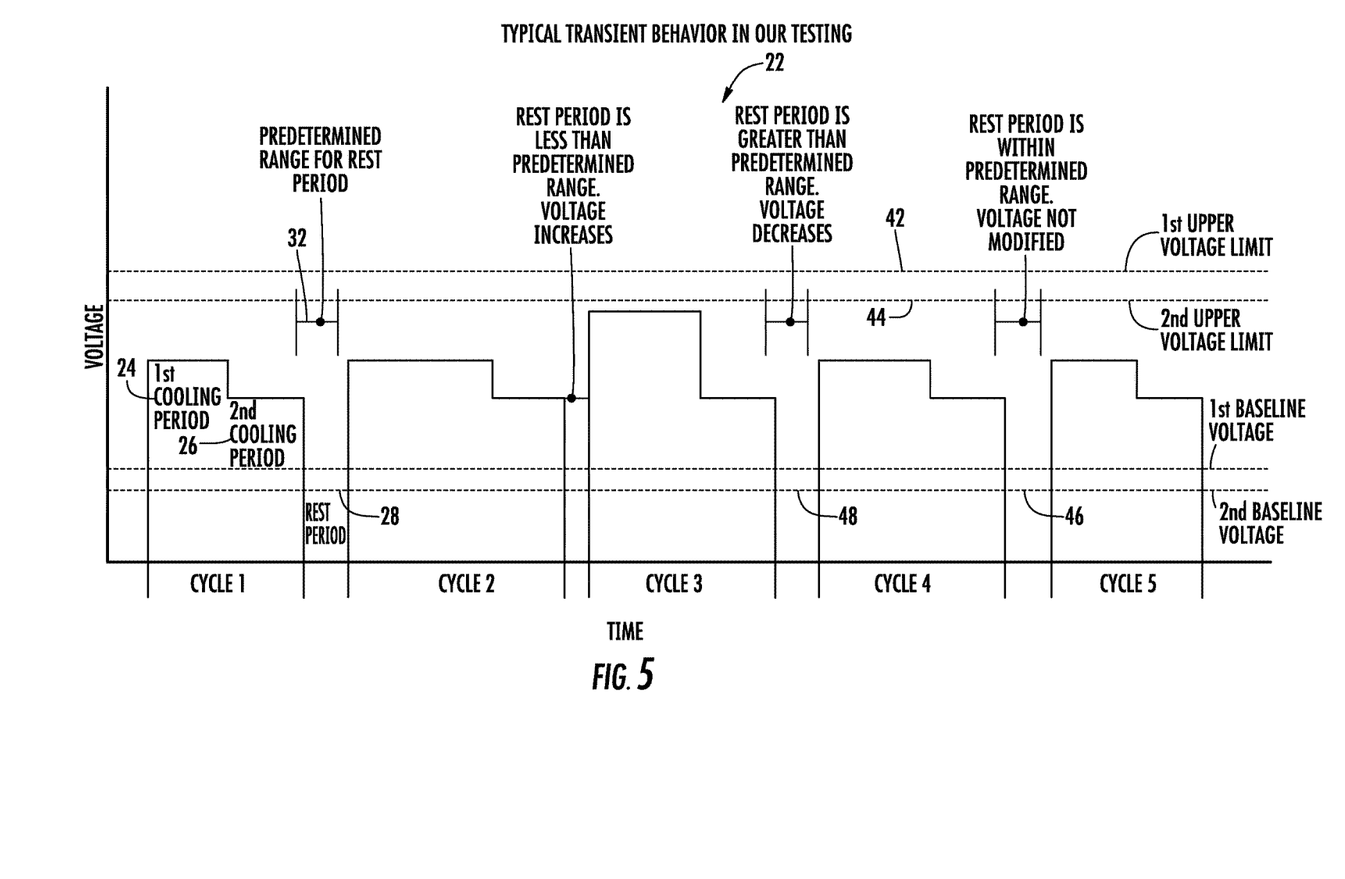
FIG. 5 is a schematic of one type of recurring cooling cycle using one embodiment of the method.

Referring now to the illustrated embodiment, as shown in FIG. 5, one configuration of the recurring cooling cycle 22 is the first cooling period 24 followed by the second cooling period 26 followed by a rest period 28. While not optimal, other cooling cycle configurations may be used, such as a rest period at the beginning of the cooling cycle, or a rest period during the middle of the cooling cycle.

Referring back to FIG. 1, the first interior 10 also includes a processor 30 that selects the command input signal to be supplied to the electric compressor 20. In this way, the processor 30 can establish the recurring cooling cycle 22. In order to establish the recurring cooling cycle 22, the processor 30 is configured to monitor various conditions present in the refrigerator 10.

By way of explanation and not limitation, the processor 30 is configured to: monitor the voltage to the compressor 20 during each recurring cooling cycle 22, monitor the length of the rest period 28 during each recurring cooling cycle 22, monitor a temperature 34 of the first interior 12, and monitor a temperature 36 of the second interior 14. Based upon these conditions, the processor selects the command input signal to supply to the compressor 20 during a subsequent first or second cooling period 24, 26. The processor 30 supplies the selected command input signal to the compressor 20 when the length of the rest period 28 is above or below a predetermined range 32. The processor 30 also selects and supplies the command input signal based on at least one of the first and second temperatures 34, 36 and the voltage to the compressor 20 during the cooling cycle 22.

In order for the processor 30 to monitor the conditions of the refrigerator 10, the refrigerator 10 can include a voltage monitor 21 to monitor the voltage to the compressor 20 and to monitor the beginning and end of each rest period 28 so that the length of the rest period 28 can be determined. The refrigerator 10 can also include a first interior temperature sensor 38 for sensing the actual first interior temperature 34; a second interior temperature sensor 40 for sensing the actual second interior temperature 36; and the processor 30 electrically coupled to the compressor.

The processor 30 is programmed or otherwise configured for turning the compressor 20 on and off based upon the readings of the temperature sensors 38, 40. In alternative embodiments, the temperature sensors 38, 40 are configured to activate and deactivate the compressor. In this embodiment, the processor monitors the time differences between the activations and deactivations of the compressor. It should be understood that the processor 30 of the various embodiments can include one or several processors working cooperatively to accomplish the method described herein.

Having generally described the structure of the refrigerator 10, a method for controlling the temperature in an appliance cooling system is now described. As illustrated in FIG. 1, the heat load compensation method (50) is generally executed by the processor 30, which executes an algorithm in order to control the command input signal provided to the electric compressor 20. The reference numbers for the steps of the heat load compensation method (50) are generally indicated within parenthesis to distinguish from the physical aspects of the refrigerator.

As illustrated in FIG. 1, the processor first determines the length of the rest period 28 for a given recurring cooling cycle 22 (52). Using this length, the processor then determines whether the length of the rest period 28 has exceeded or fallen below a predetermined time range 32 (54). Based upon this comparison of the actual length of the rest period 28 against the predetermined rest period, the processor initiates a first algorithm (56) when the length of the rest period 28 has fallen below the predetermined range 32. Alternatively, the processor initiates a second algorithm (58) when the length of the rest period 28 has exceeded the predetermined range 32. Where the actual length of the rest period 28 is within the predetermined range, the processor does not supply a command input signal to the compressor 20.

By way of explanation and not limitation, when the length of the rest period 28 falls below the predetermined range 32, this provides an indication to the processor 30 that the compressor 20 is struggling to satisfy the cooling requirements of the first and/or the second interior compartments 12, 14. Accordingly, the described embodiment can initiate the first algorithm 56 to increase the cooling supplied by the compressor 20 in order to satisfy the cooling requirements of the various interior compartments 12, 14. Conversely, when the length of the rest period 28 exceeds the predetermined range 32, this provides an indication to the processor 30 that the compressor 20 is easily achieving its objective of taking the compartment temperatures to their predetermined lowest limits. Under such conditions, the processor can initiate the second algorithm 58 in order to reduce the amount of cooling supplied by the compressor 20 and used by the refrigerator 10.

It should be understood that the length of the rest period 28 can be determined by several methods. In one embodiment, the rest period 28 is determined as a percentage of the recurring cooling cycle 22. Accordingly, the predetermined range 32 is also a percentage range of the recurring cooling cycle 22, in which case, the beginning of the recurring cooling cycle 22 is also monitored. In other embodiments, the rest period 28 is a length of time lapsed from the beginning of the rest period 28 to the end of the rest period 28 and the predetermined range 32 is also a predetermined length of time.

Figure 3:
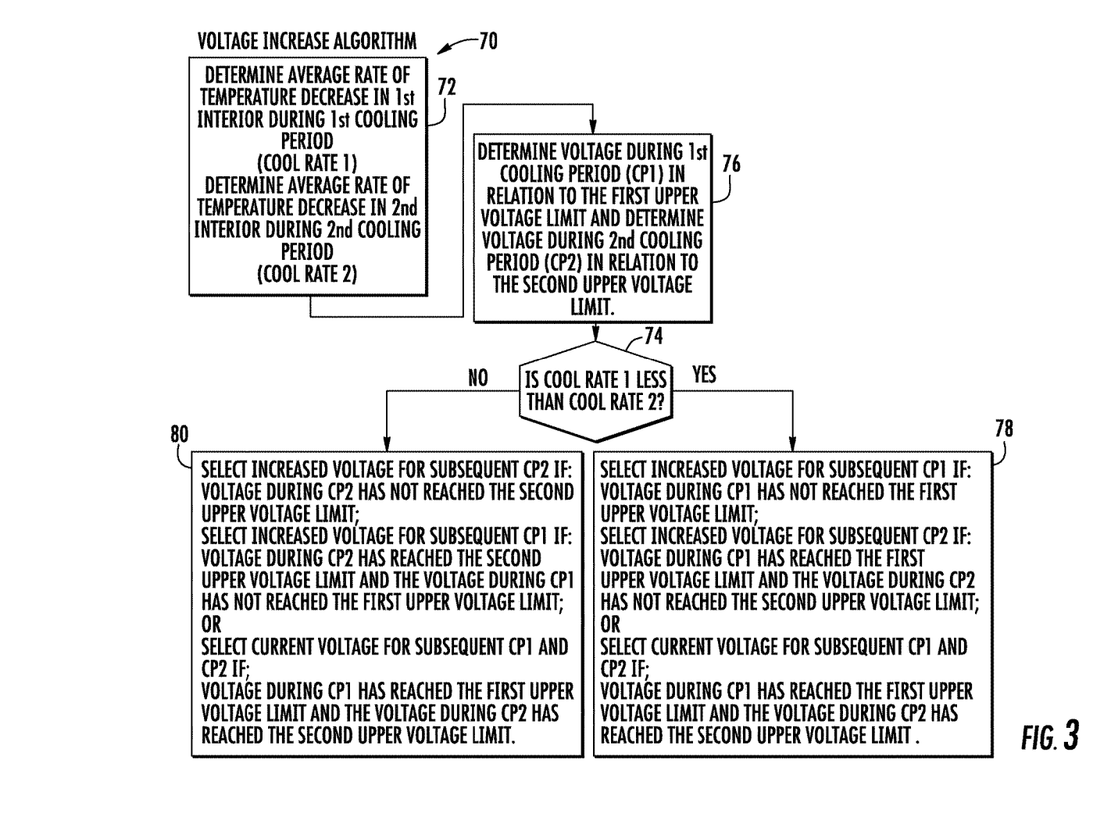
FIG. 3 is a flowchart of a voltage increase portion of one embodiment of the method of FIG. 1.

Referring now to FIG. 3, another aspect method includes the increase algorithm (70). As discussed above, the increase algorithm (70) is initiated when the length of the rest period 28 falls below the predetermined range 32. During implementation of the increase algorithm (70), the processor 30 monitors the temperature in the first interior 12 during the current first cooling period 24 in order to determine a rate of temperature decrease during this first cooling period 24 (72). The processor 30 also monitors the temperature in the second interior 14 during the second cooling period 26 in order to determine the rate of temperature decrease during the second cooling period 26 (72). Using the two rates, the processor 30 compares the rate of temperature decrease for the first interior 12 during the first cooling period 24 and the rate of temperature decrease for the second interior 14 during the second cooling period 26 in order to determine which cooling period 12, 14 has the slower rate of temperature decrease (74). The processor 30 also monitors whether the voltage to the compressor 20 during the first and/or the second cooling periods 24, 26 or both are at their respective predetermined maximum voltages 42, 44 (76).

Based upon this collected and analyzed information, the processor 30 then selects a command input signal to the compressor 20 during the first cooling period 24 when the first cooling period voltage 46 is less than the predetermined maximum voltage for that cooling period 42, or where the first cooling period voltage is at its maximum 42, the processor 30 selects a command input signal to the compressor 20 during the second cooling period 26. However, where the voltage to the compressor 20 during the second cooling period 26 is also at its predetermined maximum voltage 44, such that the voltages during the first and second cooling periods 24, 26 are each at their respective maximum voltages 42, 44 the algorithm selects the same command input signal to supply to the compressor 20 (78).

The command input signal supplied by the processor 30 can include varying commands to the compressor 20. These commands can include, but are not limited to, increases or decreases in the amount of voltage sent to the compressor 20, increases or decreases in the amount of cooling supplied by the compressor 20, and other increases or decreases related to the output of the compressor 20.

The processor 30 can also select and supply a command input signal to increase the output of the compressor 20 during the second cooling period 26 when the second cooling period voltage is less than the predetermined maximum voltage for that cooling period 44, or where the voltage during the second cooling period 26 is at a maximum, the processor supplies a command input signal to increase the output of the compressor during the first cooling period 24. However, as discussed above, where the voltage to the compressor 20 during the first cooling period 24 is also at its predetermined maximum voltage 42, such that the voltages during the first and second cooling periods 24, 26 are each at their respective maximum voltages 42, 44, the algorithm selects the same command input signal supply to the compressor 20 (80).

By way of explanation and not limitation, the amount that the increase algorithm (70) increases the output of the compressor 20 during the first or second cooling periods 24, 26 can be varied. By way of example, the amount of increased output when the length of the rest period 28 is nominal may be greater than the amount of output increase when the length of the rest period 28 is closer to the predetermined range 32. In addition, if the rates of temperature decrease during the first and second cooling periods 24, 26 are equal, the increase algorithm 70 can, by default, increase the output of the compressor during one of the cooling periods 24, 26.

Figure 4:
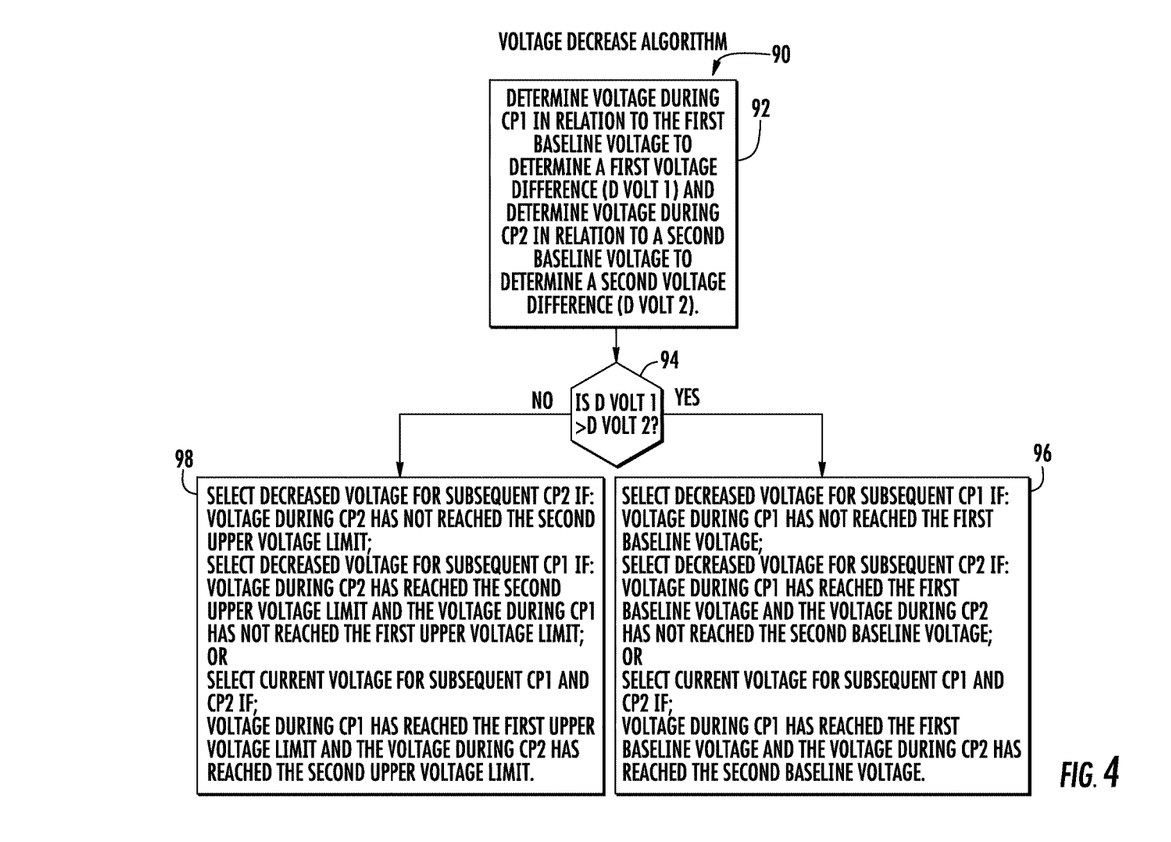
FIG. 4 is a flowchart of a voltage decrease portion of one embodiment of the method of FIG. 1.

Referring now to FIG. 4, another aspect of the method (50) includes the decrease algorithm (90). As discussed above, the decrease algorithm (90) is initiated when the length of the rest period 28 for the cooling cycle 22 exceeds a predetermined range 32. The processor monitors the voltage during the first cooling period 24 in relation to a first predetermined baseline voltage 46 during the first cooling period 24 and also monitors the voltage to the compressor 20 during the second cooling period 26 in relation to a second predetermined baseline voltage 48 for the second cooling period 26 (92). The processor 30 compares first and second cooling period voltages 24, 26 and determines which cooling period 24, 26 has a voltage that is farther from its respective predetermined baseline voltage 46, 48 (94).

Based upon this information, the processor 30 selects a command input signal to the compressor 20 during the first cooling period 24 when the first cooling period voltage is farther from its minimum voltage 46 than the second cooling period voltage is from its minimum voltage 48. When the voltage to the compressor 20 during the first cooling period 24 is already at its predetermined minimum voltage 46, the processor selects a command input signal to decrease the compressor 20 output during the second cooling period 26. And, when the voltages during the first and second cooling periods 24, 26 are already at their respective minimum predetermined voltages 46, 48, the same command input signal is selected during the subsequent cooling cycle 22 (96).

Alternatively, the processor 30 selects a command input signal to decrease the compressor 20 output during the second cooling period 26 when the second cooling period voltage is farther from its predetermined minimum voltage 48 than the first cooling period voltage is from its predetermined minimum voltage 46. But, when the voltage to the compressor 20 during the second cooling period 26 is already at its predetermined baseline voltage 48, in which case, a command input signal is delivered to decrease the compressor 20 output during the first cooling period 24. And, when the voltages during the first and second cooling periods 24, 26 are already at their minimum predetermined voltages 46, 48 the same command input signal is selected and supplied during the subsequent cooling cycle 22 (98).

It should be understood that the amount of compressor 20 output decrease during a subsequent cooling cycle 22 can vary depending on certain factors. By way of example, the output decrease to the compressor 20 may be greater when the rest period 28 is farther above the predetermined range 32. Also, the output decrease can be greater as the voltage to the compressor 20 reaches a maximum voltage for the first or second cooling period 24, 26, or both.

In addition, the amount the compressor 20 output is increased as a result of the increase algorithm (70) may not be equal to the amount of compressor 20 output is decreased as a result of the decrease algorithm (90). In one embodiment, the amount of output increase as a result of executing the increase algorithm (70) is greater than the amount of output decrease as a result of executing the decrease algorithm (90). This is to allow the heat load compensation method (50) to make fine modifications and minimize the occurrence of the heat load compensation method (50) overcorrecting from the rest period 28 being too short to the rest period 28 being too long, or vice versa.

In the described embodiment, during the increase algorithm (70), the rate of temperature decrease for the first and second interiors determines which cooling period 24, 26 will receive additional output from the compressor 20. And in the decrease algorithm (90), the voltage to the compressor 20 during the first and second cooling periods 24, 26 determines which cooling period 24, 26 will receive a decreased output from the compressor 20. While not preferred, it should be understood that these determining parameters may be switched, or other parameters may be used that relate to the effectiveness of the compressor 20 during the various cooling cycles 24, 26.

Referring again to FIG. 1, one aspect of the net heat load compensation control includes the refrigerator 10 as generally described above. In one embodiment, the refrigerator 10 contains a first interior corresponding to a refrigerator compartment 12, and a second interior corresponding to a freezer compartment 14. First and second evaporators 16, 18 provide cooling to the refrigerator and freezer compartments 12, 14. An electrical compressor 20 provides coolant to the evaporators 16, 18, where the temperature of the coolant provided to the evaporators 16, 18 is determined by the selected command input signal provided to the compressor 20.

The output of the compressor 20 is regulated by the processor 30. By selecting and supplying a command input signal, the processor 30 can set each recurring cooling cycle 22 and regulate the amount of cooling provided to the evaporators 16, 18 during each cooling cycle 22.

To assist the processor 30 in regulating voltage, a voltage monitor 21 provides the processor 30 with information regarding the voltage to the compressor 20. This voltage information is used by the processor 30 to determine the beginning and end of each cooling cycle 22 and the beginning and end of each rest period 28.

As discussed above, the length of time from the beginning of the rest period 28 to the end of the rest period 28 is used to determine whether to initiate the increase algorithm (70), the decrease algorithm (90), or to not make any change to the command input signal supplied to the compressor 20. Also, as discussed above, this voltage information is used to determine which cooling period 24, 26 should receive a decrease compressor 20 output during the decrease algorithm (90).

Temperature sensors 38, 40 are located in both of the refrigerator and freezer compartments. The temperature sensors 38, 40 relay information concerning the temperature of the compartments 12, 14 to the processor 30. The processor 30 then uses this information to determine both the temperatures 34, 36 in each compartment as well as the rate of temperature decrease in each compartment 12, 14.

As discussed in the heat load compensation method (50) above, the processor 30 uses these two rates of temperature decrease in order to determine which cooling period 24, 26 should receive a compressor 20 output increase during the execution of the increase algorithm (70).

Moreover, the processor 30 uses the temperature 34, 36 information from the two compartments 12, 14 to determine when the interior temperature 34, 36 of each compartment 12, 14 has reached a maximum threshold temperature that would indicate a first or second cooling period 24, 26 should begin, and a minimum predetermined temperature that would indicate that a first or second cooling period 24, 26 should end.

It should be understood that the processor 30 described herein may not be limited to operating the method described herein, and the processor 30 may be designated for other features of the refrigerator 10.

In various embodiments, the refrigerator 10 configured to run the above-described method may not be limited to a first and second interior, and may have more interiors or specialty cooling modules for which the above-described method can be used to regulate the temperature of, by regulating the command input signal to the compressor that provides cooling to the various compartments and specialty cooling modules.

In other embodiments, various parameters and limits disclosed herein are adjustable at the time of manufacturing or after purchase. As an example, and not a limitation, a refrigerator 10 that is modified after purchase to include an additional cooling module may require a different predetermined range for the rest time because of the additional cooling requirements. In the same respect, the processor may be configured to modify the cooling requirements during a cooling cycle based upon modifications to the appliance by adding or subtracting special cooling modules.

It will be understood by one having ordinary skill in the art that construction of the described net heat load compensation control and other components is not limited to any specific material. Other exemplary embodiments of the invention disclosed herein may be formed from a wide variety of materials, unless described otherwise herein.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The above description is considered that of the illustrated embodiments only. Modifications of the invention will occur to those skilled in the art and to those who make or use the invention. Therefore, it is understood that the embodiments shown in the drawings and described above is merely for illustrative purposes and not intended to limit the scope of the invention, which is defined by the following claims as interpreted according to the principles of patent law, including the Doctrine of Equivalents.

The invention claimed is:

1. A method for controlling temperature in an appliance cooling system comprising:
   providing an electric compressor operating in a recurring cooling cycle wherein each recurring cooling cycle comprises a first cooling period for cooling a first interior, a second cooling period for cooling a second interior, and a rest period;
   providing a processor for regulating a command input signal that is supplied to the electric compressor to establish a voltage delivered to the electric compressor during the first and second cooling periods of the recurring cooling cycle;
   monitoring the voltage to the electric compressor during the recurring cooling cycle, wherein during the first cooling period the electric compressor uses a first cooling period voltage falling between a first baseline voltage and a first upper limit voltage, and wherein during the second cooling period the electric compressor uses a second cooling period voltage falling between a second baseline voltage and a second upper limit voltage;
   monitoring a length of the rest period when no command input signal is provided to the electric compressor;
   monitoring a first rate of temperature decrease of the first interior;
   monitoring a second rate of temperature decrease of the second interior;
   comparing the first and second rates of temperature decrease to determine which interior has a temperature that decreases at a slower rate; and
   selecting the command input signal to supply to the electric compressor during a subsequent first or second cooling period, wherein when the length of the rest period falls outside a predetermined range, a compressor output is modified based upon at least one of the first rate of temperature decrease, the second rate of temperature decrease and the voltage delivered to the electric compressor during the first and second cooling periods of the recurring cooling cycle; wherein:
   selecting the command input signal to supply to the electric compressor during the subsequent first or second cooling period further comprises:
   a. increasing the compressor output during the subsequent first cooling period by a predetermined step-up value in response to:
      i. the length of the rest period falling below a predetermined lower limit of the predetermined range, the first rate of temperature decrease in the first interior being less than or equal to the second rate of temperature decrease in the second interior, and the voltage to the electric compressor during the first cooling period not reaching the first upper limit voltage; or
      ii. the length of the rest period falling below the predetermined lower limit, the second rate of temperature decrease in the second interior being less than the first rate of temperature decrease in the first interior, and the voltage to the electric compressor during the second cooling period reaching the second upper limit voltage;
   b. increasing the compressor output during the subsequent second cooling period by the predetermined step-up value in response to:
      i. the length of the rest period falling below the predetermined lower limit, the second rate of temperature decrease in the second interior being less than the first rate of temperature decrease in the first interior, and the voltage to the electric compressor during the second cooling period not reaching the second upper limit voltage; or
      ii. the length of the rest period falling below the predetermined lower limit, the first rate of temperature decrease in the first interior being less than or equal to second rate of temperature decrease in the second interior, and the voltage to the electric compressor during the first cooling period reaching the first upper limit voltage; and
   c. not increasing the compressor output during the subsequent first or second cooling period in response to:
      i. the length of the rest period not falling below the predetermined lower limit, or
      ii. the length of the rest period falling below the predetermined lower limit and the voltage to the electric compressor during the first and second cooling periods reaching the first and second upper limit voltages, respectively.

2. The method of claim 1, wherein a step of monitoring the voltage to the electric compressor during the recurring cooling cycle further comprises:
   during the first cooling period the processor supplies a selected first command input signal to the electric compressor, and during the second cooling period the processor supplies a selected second command input signal to the electric compressor; and
   monitoring a first voltage difference between the first cooling period voltage and the first baseline voltage, and a second voltage difference between the second cooling period voltage and the second baseline voltage.

3. The method of claim 2, wherein:
   the predetermined range includes the predetermined lower limit and a predetermined upper limit, and, wherein when the length of the rest period falls below the predetermined lower limit, the command input signal is selected based upon the first and second rates of temperature decrease, and wherein when the length of the rest period reaches the predetermined upper limit the command input signal is modified based upon the voltage provided to the electric compressor during a most recent first cooling period and a most recent second cooling period of the recurring cooling cycle.

4. The method of claim 3, further wherein the predetermined lower limit is a first predetermined percentage of time for each recurring cooling cycle, and wherein the predetermined upper limit is a second predetermined percentage of time for each recurring cooling cycle.

5. The method of claim 3, wherein a step of selecting the command input signal to supply to the electric compressor during the subsequent first or second cooling period further comprises:
   a. decreasing the compressor output during the subsequent first cooling period by a predetermined step-down value in response to:
      i. the length of the rest period reaching the predetermined upper limit, the first voltage difference being greater than or equal to the second voltage difference, and the voltage to the electric compressor during the first cooling period not reaching the first baseline voltage; or
      ii. the length of the rest period reaching the predetermined upper limit, the second voltage difference being greater than the first voltage difference, and the voltage to the electric compressor during the second cooling period reaching the second baseline voltage;
   b. decreasing the compressor output during the subsequent second cooling period by a predetermined step-down value in response to:
      i. the length of the rest period reaching the predetermined upper limit, the second voltage difference being greater than the first voltage difference, and the voltage to the electric compressor during the second cooling period not reaching the second baseline voltage; or
      ii. the length of the rest period reaching the predetermined upper limit, the first voltage difference being greater than or equal to the second voltage difference, and the voltage to the electric compressor during the first cooling period reaching the first baseline voltage; and
   c. not decreasing the compressor output during the subsequent first or second cooling periods in response to:
      i. the length of the rest period not reaching the predetermined upper limit, or
      ii. the length of the rest period reaching the predetermined upper limit and the voltage to the electric compressor during the first and second cooling periods reaching the first and second baseline voltages, respectively.

6. The method of claim 1, wherein:

the predetermined range includes the predetermined lower limit and a predetermined upper limit, and, wherein when the length of the rest period falls below the predetermined lower limit, the command input signal is selected based upon the first and second rates of temperature decrease, and wherein when the length of the rest period reaches the predetermined upper limit the command input signal is selected based upon the voltage to the electric compressor during the first and second cooling periods of the recurring cooling cycle.

* * * * *